United States Patent [19]

Sondergeld et al.

[11] Patent Number: 4,692,910
[45] Date of Patent: Sep. 8, 1987

[54] METHODS OF DETERMINING LITHOLOGICAL CHARACTERISTICS OF AN UNDERGROUND FORMATION WHICH UTILIZE COMPRESSIONAL VELOCITY AND SHEAR VELOCITY DATA

[75] Inventors: Carl H. Sondergeld; Albert L. Frisillo, both of Broken Arrow; Janice O. Norris, Tulsa, all of Okla.

[73] Assignee: Amoco Corporation, Chicago, Ill.

[21] Appl. No.: 711,115

[22] Filed: Mar. 11, 1985

[51] Int. Cl.$^4$ .............................................. G01V 1/28
[52] U.S. Cl. ....................................... 367/75; 364/421
[58] Field of Search ...................... 367/75, 38, 31, 59, 367/63; 364/421, 422

[56] References Cited

U.S. PATENT DOCUMENTS 4,373,197  2/1983  Gassaway et al. ................... 367/36
4,375,090  2/1983  Thompson et al. ................... 367/75

OTHER PUBLICATIONS

McCormack et al., "A Care Study of Stratigraphic . . . " Geophysics, vol. 49, #5.
Nations, J. F., "Lithology and Porosity from Acoustic Shear and Compressional . . . " 15 Annual Logging Symposium of SPWLA, 6/2/74 Tencs.
Eastwood et al. "Basis for Interpretation of Vp/Vs Ratios in Complex Lithologies," SPWLA 24th Logging Symp., 6/27/83.

Primary Examiner—Thomas H. Tarcza
Assistant Examiner—Ian J. Lobo
Attorney, Agent, or Firm—Scott H. Brown; Fred E. Hook

[57] ABSTRACT

Methods and related apparatus are described for determining lithological characteristics, such as formation material type and porosity, of an underground formation by utilizing compressional velocity ($V_p$) and shear velocity ($V_s$) data. One described method utilizes the plotting of $V_p$ and/or $V_s$ versus a Seismic Parameter, such ad $K/\rho$ or the Bulk Velocity, and boundaries of velocity values of certain formation material types to define a field of data points. By comparing the position of the data points to the boundaries of the formation material types, the formation material type and, later, porosity can be determined. A method is described for determining the presence of a hydrocarbon gas at a particular location in an underground formation utilizing the above methods. Also, a method is described for determining $V_s$ from $V_p$ data and obtained ratios of $V_p$ and $V_s$ for at least one formation material type.

8 Claims, 15 Drawing Figures

METHODS OF DETERMINING LITHOLOGICAL CHARACTERISTICS OF AN UNDERGROUND FORMATION WHICH UTILIZE COMPRESSIONAL VELOCITY AND SHEAR VELOCITY DATA

BACKGROUND OF THE INVENTION

1. Field of the Invention

The present invention relates to methods of determining lithological characteristics of an underground formation and, more particularly, to such methods which utilize compressional velocity ($V_p$) and shear velocity ($V_s$) data.

2. Setting of the Invention

In locating, drilling for, and the production of hydrocarbons from underground formations it is often useful to know certain lithological characteristics of the underground formations. Lithological characteristics include the pore and crack porosity, matrix mineralogy, cementation, permeability, and fluid saturation of an underground formation. Many methods and related apparatus have been used for this purpose with the more common methods including examining core samples from the underground formations, examining the drill cuttings when drilling a wellbore, and utilizing various logging procedures after a wellbore has been established. One disadvantage of these methods is that they all require the drilling of a wellbore, which is an expensive undertaking, or the use of a preexisting wellbore. These measurements also require suitable sample sizes to be recovered, which is often difficult to achieve. Further, permeability cannot be determined from rock fragments.

One method used to determine certain lithological characteristics does not require the use of a wellbore but uses both compressional velocity ($V_p$) data and shear velocity ($V_s$) obtained from any commercially available manner, as is well known in the geophysical art. In this method, a plot is made (by hand or with the aid of a computer) of the rate of compressional velocity data/shear velocity data ($V_p/V_s$) on one axis and either the compressional velocity data ($V_p$) or the shear velocity data ($V_s$) on a second axis. It has been found that different formation material types have predictable ranges, i.e., maximum and minimum theoretical values, of $V_p$ and $V_s$, thus a plot of data points (corresponding to a particular location or depth point in the underground formation) can be made. By using previously obtained data, different areas or boundaries of $V_p/V_s$ or $V_p$ and $V_s$ data can be placed within the plot for each of the desired different formation material types. FIG. 1 represents such a plot and includes typical boundaries for three common formation material types. The data points which fall within a particular boundary can usually be categorized as being of the particular labeled formation material type. This plotting method is described fully in "Basis for Interpretation of $V_p/V_s$ Ratios in Complex Lithologies," by Raymond Eastwood and John P. Castanga, 24th Annual Logging Symposium, SPWLA, June 27-30, 1983, which is herein incorporated by reference.

A major problem with using the previously described plotting method, is that the ratio of $V_p/V_s$ is not monotonically dependent upon porosity regardless of saturation. Specifically, there can exist natural situations where conditions of saturation and crack and pore porosity can cause the ratio to exceed the theoretical maximum value for the uncracked matrix material; this leads to an ambiguous interpretation of the data plotted in such a manner.

There is a need for a method of determining lithological characteristics from compressional and shear data which is easy to interpret and more accurate.

Two methods described in U.S. Pat. Nos. 4,373,197 and 4,375,090 use compressional velocity data and shear velocity data to determine certain mineralogical data; however, these methods are not useful for the determination of lithological characteristics. To differentiate between mineralogical characteristics and lithological characteristics, mineralogy shall be defined as the study of minerals, i.e., naturally occurring homogeneous phases, such as gold, iron, calcite, etc. Lithology shall be defined as the study of combinations of minerals. The methods of these two patents contain no determinant factors for porosity, fluid saturation, or crack porosity. Further, these methods cannot be used to determine the presence of shales in an underground formation because there is no known "single crystal property" of clays, as is specifically needed in these methods.

One of the main lithological characteristics that is desirable to utilize is the underground formation's porosity. Many methods have been used to determine formation porosity, but most of these methods require using a wellbore to obtain core samples, or to operate porosity measuring logging tools. One method used to estimate the porosity of an underground formation without necessarily using a wellbore is to use obtained compressional velocity data in the Wylie Time Average equation, or the Raymer, et al. equation. The Wylie Time Average method of estimating porosity has been found to be accurate for porosities below about 10 percent; however, for porosities above about 10 percent, the porosity prediction using this method is suspect. Another problem in utilizing either of these methods is that a knowledge of the matrix velocity and fluid velocity for the particular geographical area is required. The matrix velocity and the fluid velocity can only be guessed at before the actual formation material is analyzed; therefore, the porosity predictions are dependent upon an operator's "educated guess" or prior experience in a particular geological environment. Also, both of these use only $V_p$ data. Since $V_s$ is much more sensitive to crack porosity and displays a porosity dependence which is different than $V_p$, it can be used to provide a more accurate measure of total porosity.

There is a need for a method to determine the porosity of an underground formation which uses compressional velocity data and shear velocity data, and which does not require the knowledge of the matrix velocity and the fluid velocity for that particular geographical area.

Another lithological characteristic that is desired to be known is fluid saturation. In reviewing porosity data obtained from commercially available source, it is known to plot the porosity measurement from a neutron logging tool as a function of depth side-by-side with porosity measurements from compensated formation density information. Wherever the two plot lines cross over each other this can be an indication that the formation material at that depth is not fully water or brine saturated, i.e., there can be gaseous hydrocarbons present. This method of indicating the presence of gaseous hydrocarbons is usually accurate; however, it requires the existence of a wellbore to obtain the porosity measurement(s) from a logging tool. There is a need for a method to determine fluid saturation without the need of a well-bore.

In the determination of lithological characteristics, as described above, both compressional velocity data and shear velocity data can be utilized; however, shear velocity data is not always obtainable. One known method to obtain an estimate of shear velocity data is to use compressional velocity data and an estimated Poisson's Ratio. For example, a Poisson solid has a value of $\nu = 0.25$ and for such materials one can compute $V_s$ from a knowledge of $V_p$. However, since the deviations from a norm are being sought, i.e., hydrocarbon filled versus brine filled reservoir rock, one cannot presume to know the in situ Poisson's ratio for the brine case without extensive testing or experience. There is a need for a simple method of accurately determining shear velocity data that can be used in the field to determine if shear velocity seismic lines are to be run, and how best to design the field equipment to image the desired objectives.

SUMMARY OF THE INVENTION

The present invention is contemplated to overcome the foregoing disadvantages and meet the above described needs. The present invention provides a method of determining certain lithological characteristics of an underground formation by utilizing compressional velocity data and shear velocity data. In one embodiment of the present invention, a seismic parameter, such as $V_B$ or $K/\rho$, is calculated utilizing previously obtained compressional velocity data and the shear velocity data. The seismic parameter is then plotted on one axis and the compressional velocity ($V_p$) is plotted on a second axis to define a field of data points, wherein each data point corresponds to a particular location in the underground formation. Thereafter, velocity boundaries, i.e., ranges of maximum and minimum theoretical values, are determined within the plot for at least one formation material type, such as sandstone, carbonates, and/or shales, and from the position of the data points relative to the velocity boundaries, at least one of the following lithological characteristics can be determined: formation material type and/or porosity.

Another embodiment of the present invention provides a method for determining the porosity of an underground formation utilizing compressional velocity and shear velocity data. Another embodiment of the present invention provides a method of determining the presence of a hydrocarbon gas at a particular location in an underground formation which utilizes compressional velocity and shear velocity data. Also, another embodiment of the present invention provides a method of determining shear velocity data from compressional velocity data.

DETAILED DESCRIPTION OF THE PREFERRED EMBODIMENTS

The present invention provides a method of determining certain lithological characteristics of an underground formation by utilizing compressional velocity and shear velocity data. In this method either the Bulk Velocity $(V_B) = (V_p^2 - (4/3)V_s^2)^{\frac{1}{2}}$ or $K/\rho = V_p^2 - (4/3)V_s^2$ is plotted on one axis and either $V_p$ or $V_s$ is plotted on a second axis. Inverses of $V_p$ or $V_s$ can be utilized; however, $V_p$, is preferred because it provides the best definition of lithological boundaries and yields a tight pattern of data points. Each of the data points so plotted corresponds to a particular location within an underground formation, and can include longitudinal, latitudinal, and depth components.

The various boundaries of the maximum and minimum theoretical values of the $V_p$ and $V_s$ data, so plotted, for at least one formation material type, usually at least carbonates, sandstones, and/or shales, is placed over the plot. Thereafter, the relative position of each data point to the boundaries can indicate what formation material type is present at a particular location in the underground formation and/or its porosity.

As used throughout this discussion "velocity" data is referred to but this term can include "slowness" (1/velocity) and "transit times".

Figure 1:
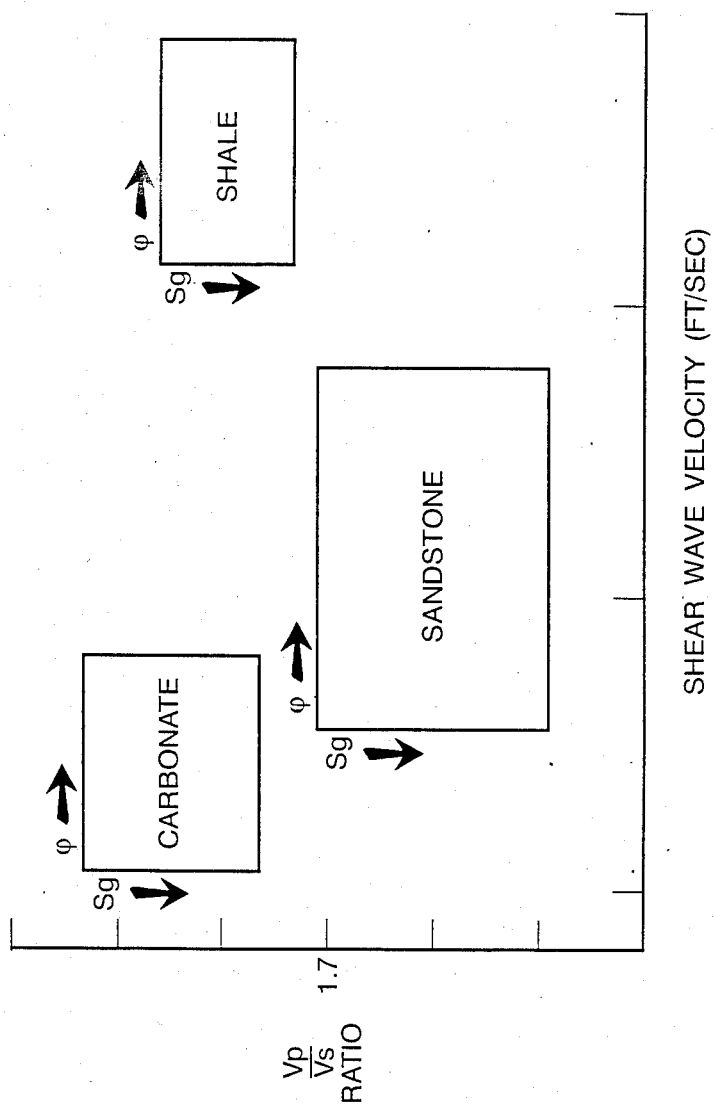
FIG. 1 is a lithological discrimination cross plot with lithological boundaries shown. Influences of porosity ($\phi$) and gas saturation ($S_g$) on these boundaries are also indicated.
Figure 2:
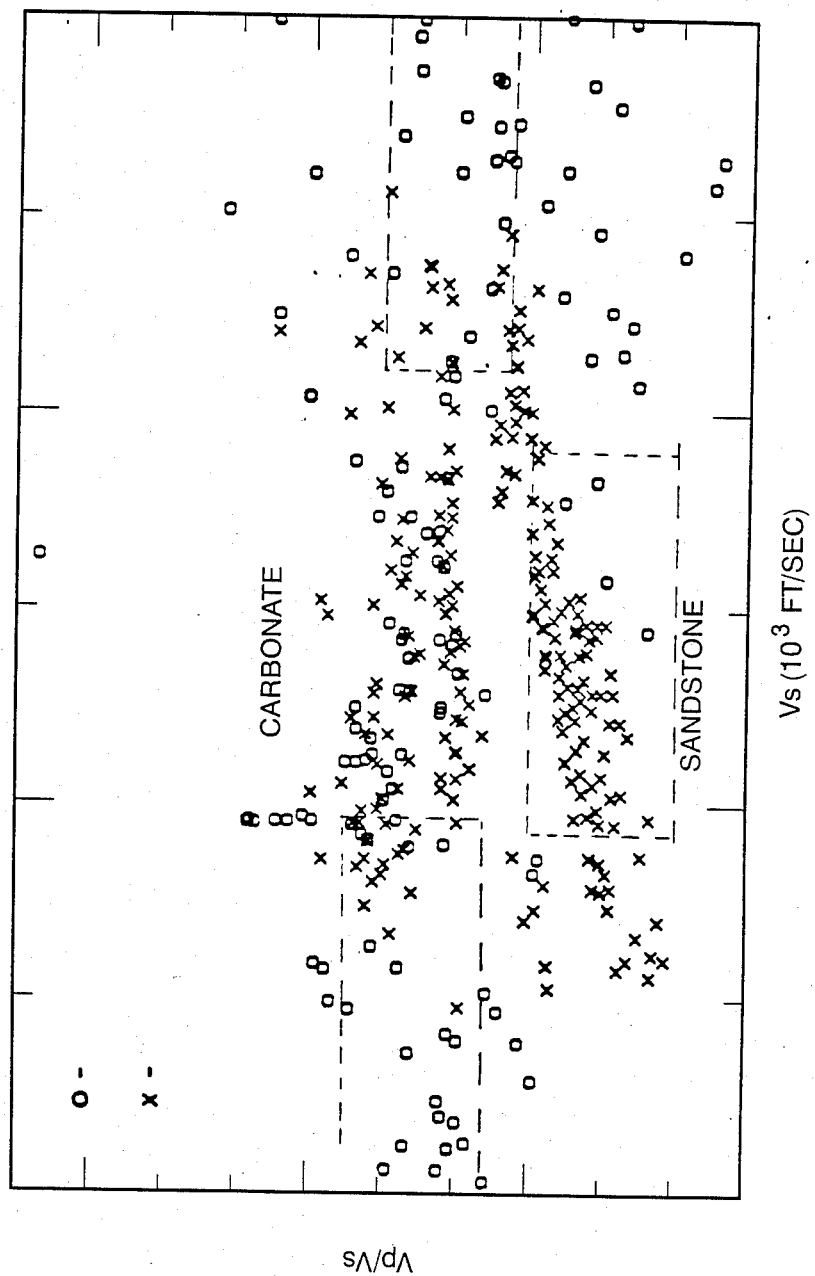
FIG. 2 is a test of lithological discrimination utilizing laboratory measurements on carbonates and sandstones.

To fully explain the advantages of the above-described method to previous methods, the following discussion is provided. As previously stated, one approach that has been used to determine certain lithological characteristics is to plot the ratio of compressional velocity to shear velocity ($V_p/V_s$) on one axis and shear velocity ($V_s$) on a second axis, as shown in FIG. 1. Accepting these boundaries in FIG. 1 as being totally accurate could lead to errors. For example, a $V_p/V_s$ value of 1.7 has often been used to define a boundary between carbonates and sandstones. However, as shown in FIG. 2, laboratory measurements of values of $V_p$ and $V_s$ for carbonates (0-symbols) and sandstones (X-symbols) are not confined to the lithological boundaries indicated in FIG. 1. Instead, both the sandstones and the carbonates extend far into the area that should be indicative of shales. The actual lithological characteristics of these particular materials are known independently and none are considered to be shaly. Thus, the plot of this combination of velocity parameters is of limited practicality in interpreting field data.

Figure 3:
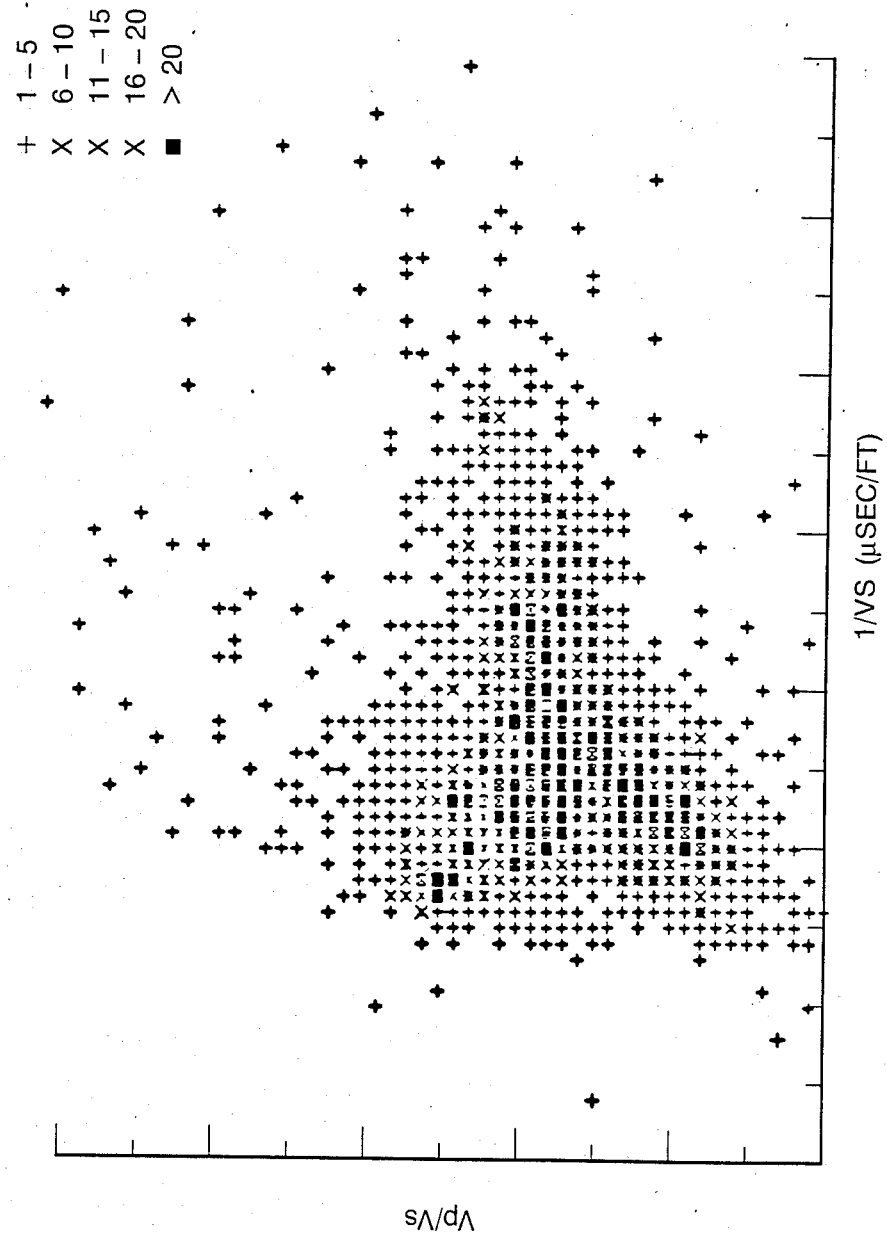
FIG. 3 is a lithological discrimination cross plot of measurements of $V_p$ and $V_s$ derived from full wavetrain sonic logs in three wells.

Also, examination of FIG. 3, which is a plot of $V_p/V_s$ versus $V_s$ from velocity data obtained from full wavetrain and sonic logs from three wells, shows that there is no apparent discrete lithological separation of the data points and the bulk of the data suggests that the data points are primarily limy-sandstones, which definitely is not the case as determined by log analysis and core samples. This problem of scattering of the data and incorrect results when using $V_p/V_s$ versus $1/V_s$ has been investigated and it has been determined that the problem is the sensitivity of the ratio of $V_p/V_s$ to crack densities. To illustrate this point, a $V_p/V_s$ response is plotted in FIG. 4 with the vertical axis as the $V_p/V_s$ ratio normalized to its uncracked, zero porosity, value and the X-axis being the crack density, $\epsilon$; i.e., the number of cracks per unit volume. A family of curves is plotted with each representing the behavior of the ratio at a constant saturation, where $\xi=1$ represents 100% water saturation while $\xi=0$ represents 0% water saturation. Note that the plot of the ratio of $V_p/V_s$ can, at a constant crack density, either be larger or smaller than its initial uncracked value. This is believed to be responsible for the undesired scatter of the data points displayed in FIG. 2 and FIG. 3.

The inventors hereof have determined that a ratio of the Bulk Velocity ($V_B$) or $K_\rho$ can be used in place of $V_p/V_s$ in these plots to accurately determine certain lithological characteristics of an underground formation. The Bulk Velocity is equal to $(V_p^2-(4/3)V_s^2)^{\frac{1}{2}}$ and $K/\rho$ is equal to $(V_p^2-(4/3)V_s^2)$.

Figure 4:
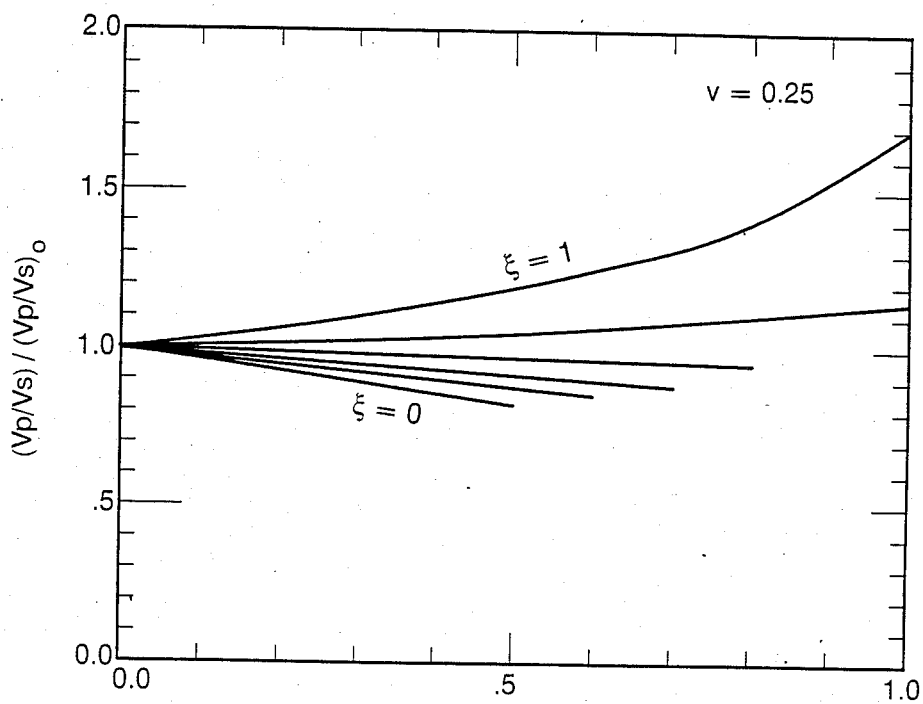
FIG. 4 is a plot of the theoretical dependence of $V_p/V_s$ on saturation ($\xi$) and crack density ($\epsilon$) assuming an intrinsic Poisson Ratio of 0.25.
Figure 5:
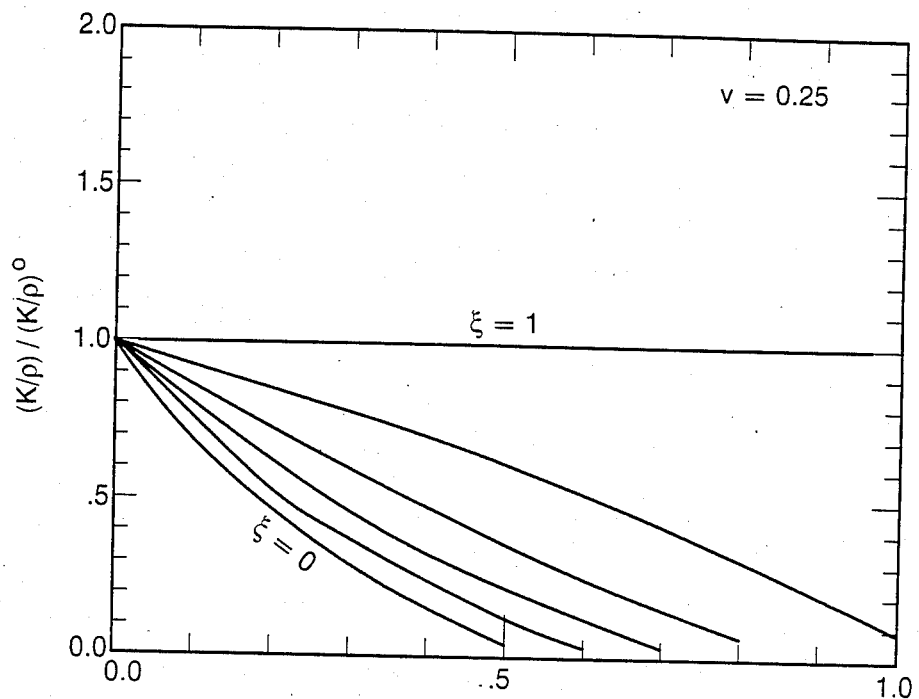
FIG. 5 is a plot of the theoretical dependence of a seismic parameter $K/\rho$ on saturation ($\xi$) and crack density ($\epsilon$) assuming an intrinsic Poisson Ratio of 0.25.

Using the same formulations as for FIG. 4, the normalized change in $K/\rho$ as a function of saturation $\xi$ and crack density $\epsilon$ is shown in FIG. 5. It is very apparent that $K/\rho$ does not exceed the uncracked value of 1. Also apparent in comparing FIGS. 4 and 5 is that the magnitude of the change in $K/\rho$ compared to $V_p/V_s$ for a given saturation change is larger, which aids in interpretation.

Figure 6:
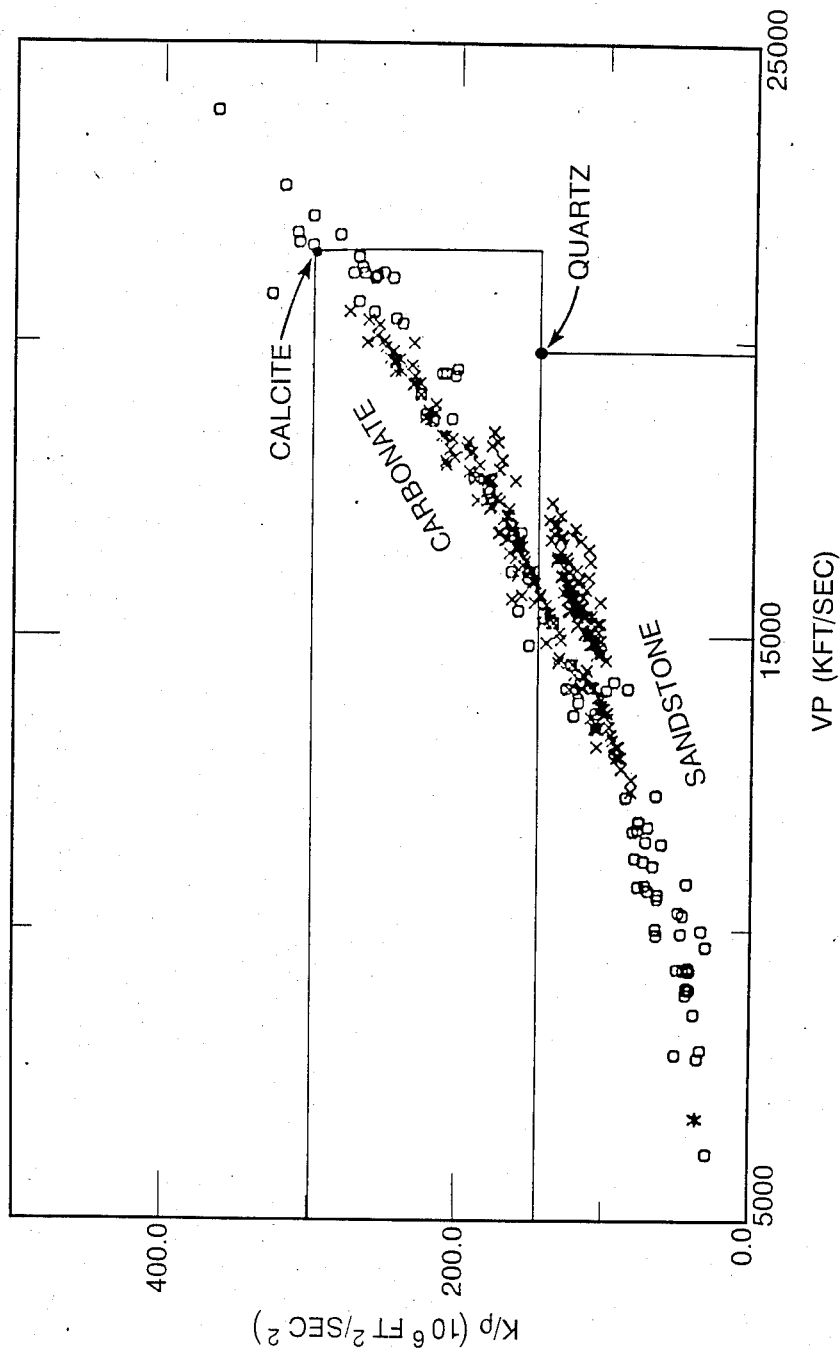
FIG. 6 is a lithological discrimination cross plot of the data of FIG. 2.

Taking the data used to plot FIG. 2, a seismic parameter (S) is calculated and plotted versus $V_p$ in FIG. 6. The seismic parameter (S) as used hereinafter can be either the Bulk Velocity ($V_B$) or $K/\rho$. Two observations are present in viewing FIG. 6, one is that the data scatter is greatly reduced from that of FIGS. 2 or 3 and that the entire data set can be defined as a simple curve or trend. The boundaries chosen for sandstone and carbonates in FIG. 6 were set by plotting the maximum values attainable for pure quartz: $V_p=19,847$ ft/sec and $K/\rho=153.9\times10^6$ ft$^2$/sec$^2$, and pure calcite: $V_p=21,422$ ft/sec and $K/\rho=296.9\times10^6$ ft$^2$/sec$^2$.

Figure 7:
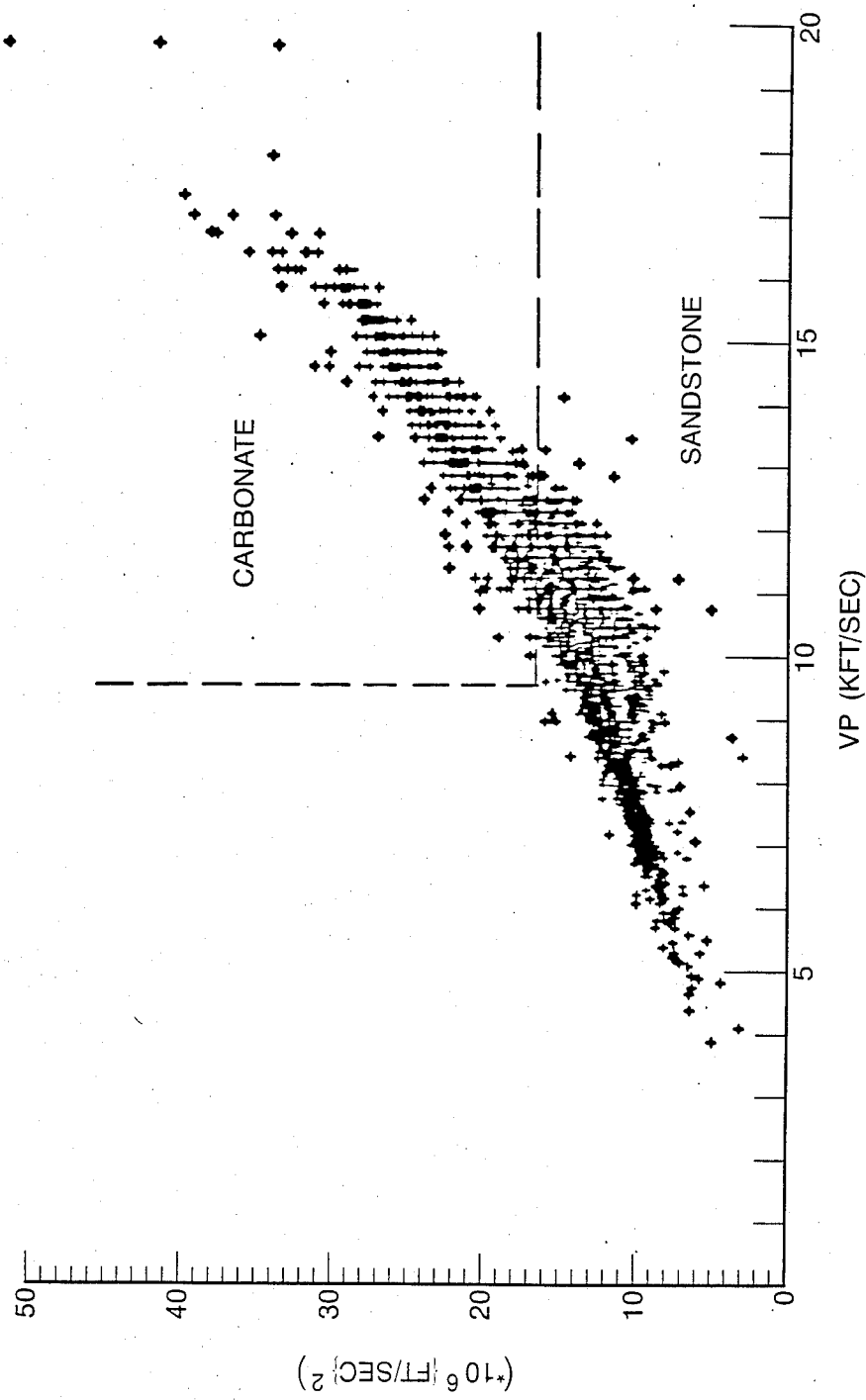
FIG. 7 is a lithological discrimination cross plot of the data of FIG. 3.

The data used to generate the plot of FIG. 3 was replotted using $K/\rho$ in FIG. 7. Although the data point distribution shown in FIG. 7 is more diffused than similar laboratory data would indicate (due to greater lithological variations in the field data), a simple trend is again easily defined. Various data points have been randomly chosen and the predicted formation material type were compared with core sample data and gamma ray logging results from the same intervals. It was found that the predictions made using the method of the present invention agreed very favorably with the laboratory data and the gamma ray logs.

The means used to carry out this embodiment of the present invention has not been found to be critical in that many sources of the velocity data can be used and many different calculation means can be used. The compressional velocity data and the shear velocity data can be obtained from conventional seismic methods and apparatus, as are well-known in the art, and the velocity boundary data can be obtained from laboratory data, core samples, textbook values, or any other accurate source. The calculation means can be as simple as a hand-held calculator or as complex as a programmable digital computer. Because of the large number of data points used, it is unlikely that the plots would be made by hand, but can be. An analog or digital computer-driven plotting device is preferably used to generate the plots used in the present invention.

The inventors of the present invention have investigated whether or not the above described method for determining formation material types could be used to determine the porosity of the formation material. The inventors discovered that porosity boundaries could be added on a third axis to the plot described previously to obtain an accurate estimate of porosity. In this method, the seismic parameter (S) is calculated using $V_p$ and $V_s$, as described above, and the velocity boundaries for at least one formation material type are determined, also as described above. In addition, from laboratory data, core samples, textbooks, or the like, certain maximum and minimum values of porosity are determined for each of the chosen formation material types.

The seismic parameter (S) is then plotted on one axis and $V_p$, $V_s$, or $1/V_s$ is plotted on a second axis. From the position of each data point to the velocity boundaries, one can determine the formation material type. The third axis (porosity) is added for each of the formation material types and thus a three-dimensional range of data points can be made. The inventors found that the three-dimensional plot of data can generally be described as planar and thus can be defined in mathematical terms. Using curve fitting techniques, such as least squares or any other known mathematical technique, an equation defined as Porosity($\phi$)$=K_1V_p+K_2K/\rho+K_3$ is fitted to the three-dimensional plot, with $K_1$, $K_2$, and $K_3$ being fitted constants. Once the equation has been defined, the porosity of a formation material is mathematically determined by using the compressional velocity and shear velocity data for that particular location in the underground formation.

The method of the present invention has been compared to field data for accuracy by comparing the porosity predictions of the present invention, using sonic wavetrain derived values of $V_p$ and $V_s$, to those inferred from neutron logs. The porosity predictions of the present invention compared very favorably.

Figure 8:
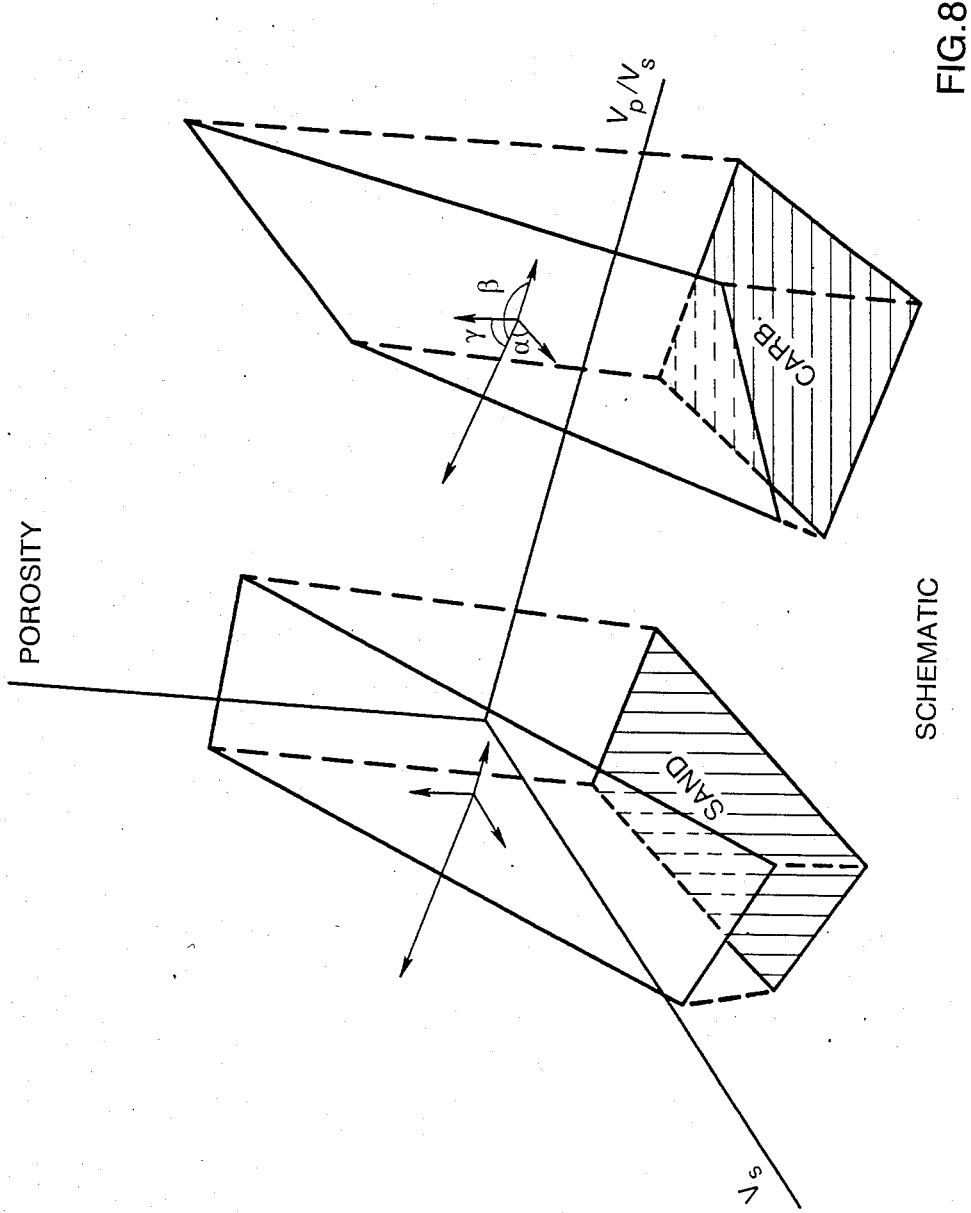
FIG. 8 is a schematic representation of a projection of $V_p$ or $V_s$ data, $V_p/V_s$ or $K/\rho$ data, and porosity data onto a two-dimensional plane.

To explain the present method in detail, FIG. 8 is provided and schematically represents the method of the present invention to determine the formation porosity by searching for correlations among two elastic variables and porosity. Recalling the previous discussions of $V_p/V_s$ and $K/\rho$, the inventors found that the lithological units are ascribed a finite areal extent. The areal extent is in part a manifestation of the influence of porosity upon the measured elastic property. FIG. 8 illustrates how the two-dimensional relations, $V_p/V_s$ and $V_s$, can be projected on a three-dimensional surface. The simplest surface, a plane, is illustrated; however, other multicurved surfaces can be used and fitted to determine porosity. However, over a certain range of porosity, the surfaces can be adequately described by a simple plane. Also, as indicated in FIG. 8, these surfaces may be lithologically dependent. It is clear from FIG. 8 that the two lithologies, sandstone and carbonates, can be described by two different planes and that the plane of the limestone data plunges more deeply with respect to the Z-axis (porosity) than the plane fitted to the sandstone data. The difference in the plunge is significant in that this indicates better porosity resolution of sandstones than of carbonates, such as limestone, given the combination of variables plotted. Thus, the inventors hereof have found a way to use two empirical functions to predict porosity of a formation material type given compressional velocity and shear velocity data.

Figure 9:
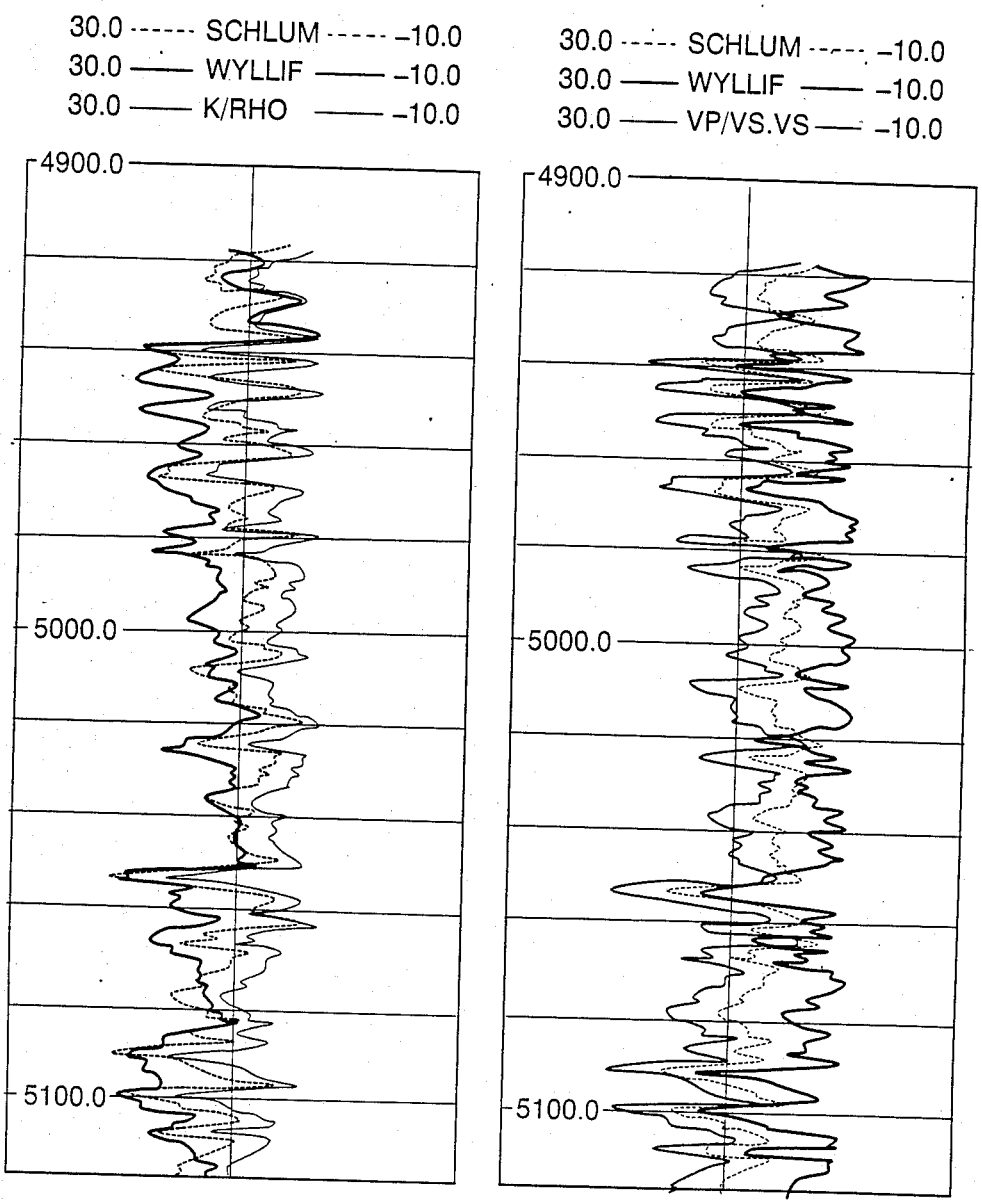
FIG. 9 is a plot comparison of the Wylie Time Average estimation of porosity (black) and the Raymer, et al. estimation of porosity (blue) with $K/\rho$ (left) and $V_p/V_s$ (right) estimations of porosity.

A comparison of the Wylie Time Average Equation, Raymer, et al. equations and values from the present invention, using actual field data, is shown in FIG. 9.

The Wylie Time Average Equation is defined as:

$$\phi = \left( \frac{V_m/V - 1}{V_m/V_f - 1} \right)$$

where $V_m$ is the matrix grain velocity, $V_f$ is the fluid velocity, and $V$ is the P-wave velocity for brine saturated rock. The matrix grain velocity is an empirical velocity appropriate for the particular host formation material and, in some cases, has no intrinsic relation to the velocities of the minerals present or the velocity of the uncracked or zero porosity host formation material.

The Raymer, et al. equation is defined as:

$$\phi = -(V_f - 2V_m) \pm \{(V_f - 2V_m) - 4V_m (V_m - V)\}^{\frac{1}{2}}/2V_m$$

The variables are the same as for the Wylie Time Average Equation. A matrix velocity of 17,850 ft/sec and a fluid velocity of 5000 ft/sec were used in the above given equations with $V_p$ values to produce the curves plotted in FIG. 9. On the left, the predictions of porosity from the Wylie Time Average Equation (black) and Raymer, et al. (blue) are compared to the porosity predictions of the above described present invention utilizing $K/\rho$ (green) as the seismic parameter (S). On the right, the Wylie Time Average (black) and Raymer, et al. (blue) porosity predictions are compared to the porosity predictions of the present invention (red) using $V_s$ and $V_p$ values (obtained from a sonic wavetrain form) as the seismic parameter (S). The empirically predicted porosities bracket the Wiley and Raymer, et al. porosities with the $K/\rho$ equation predicting a greater porosity than the $V_p/V_s$ equation predicted.

Figure 10:
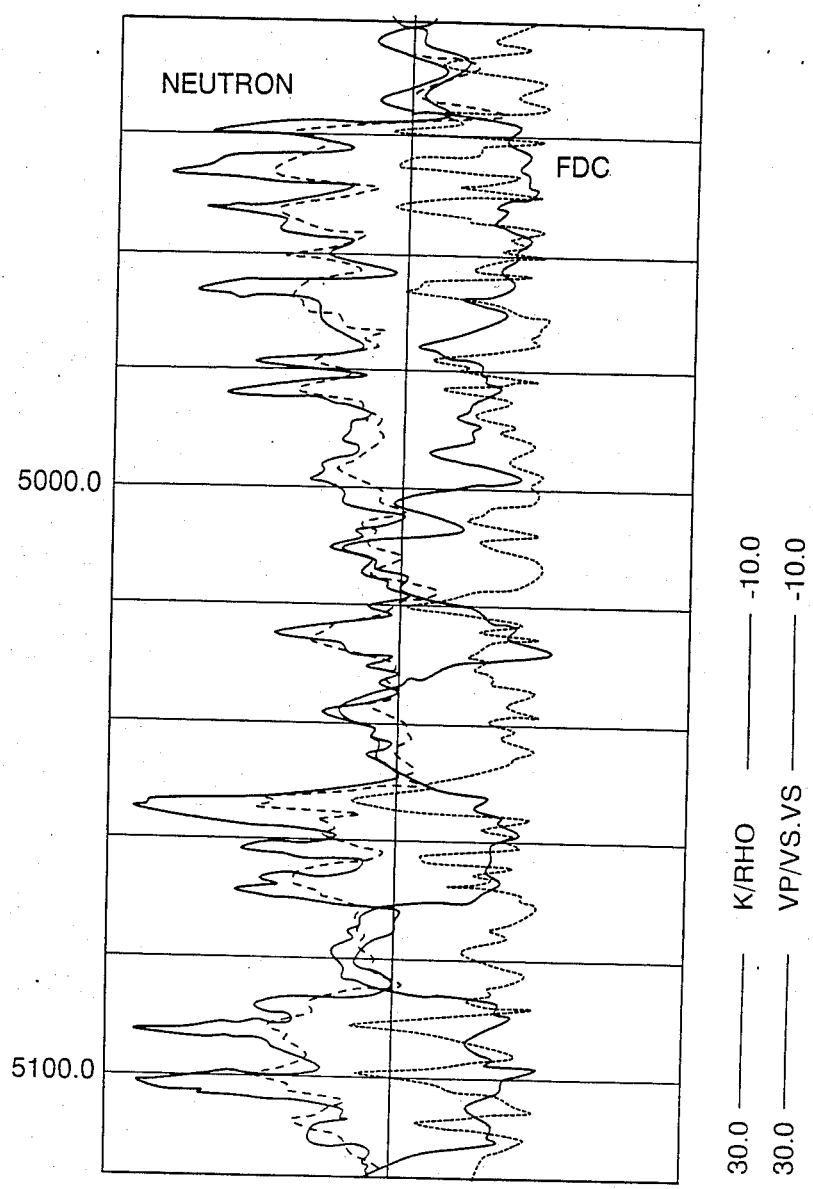
FIG. 10 is a plot comparison of porosity estimations of $V_p/V_s$ and $K/\rho$ with porosity predictions with Neutron and FDC logs.
Figure 11:
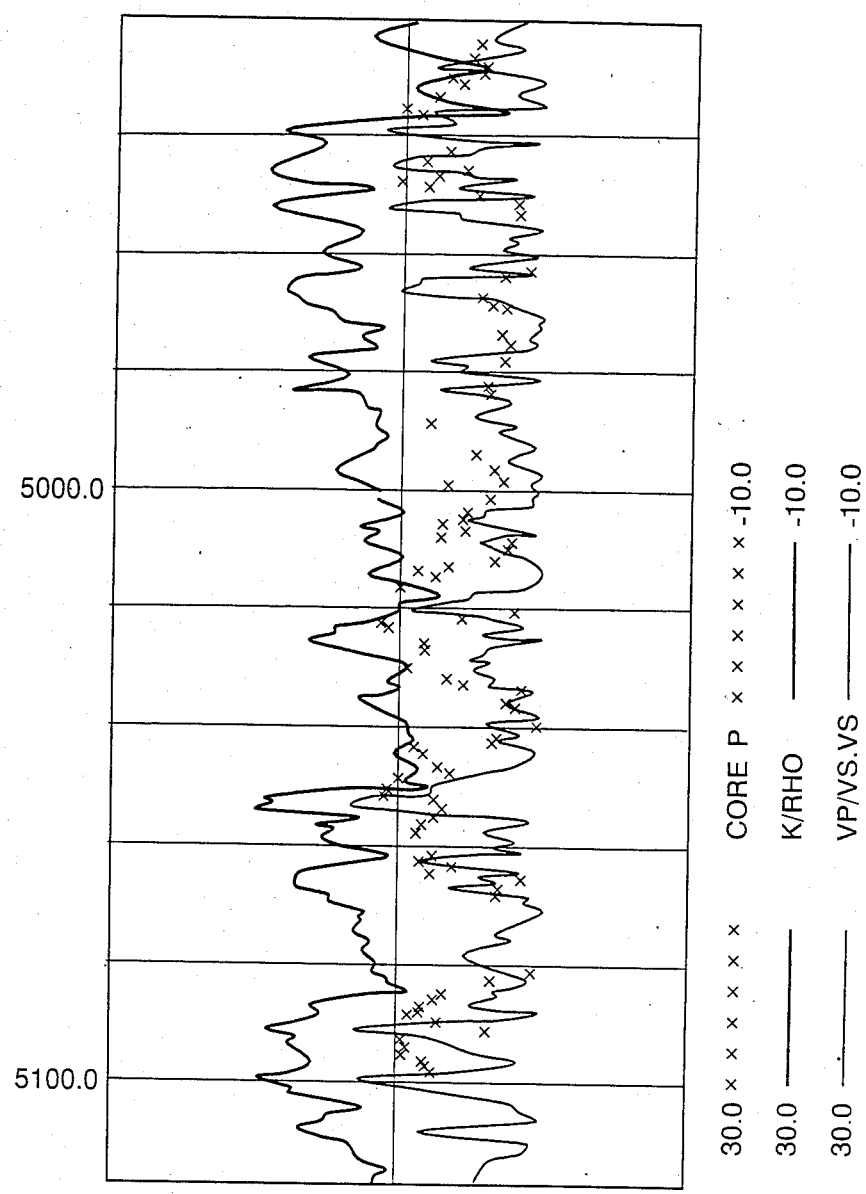
FIG. 11 is a plot comparison of porosity estimations of $V_p/V_s$ and $K/\rho$ with porosity predictions from laboratory measurements from recovered core samples.

The porosity predictions based on $K/\rho$ (red line) and $V_p/V_s$ versus $1/V_s$ (green line) are replotted in FIG. 10 with a neutron and a compensated formation density (FDC) porosity log indicated in black and blue, respectively. The logging tool porosity predictions appear to agree quite well with the empirically predicted values of the present invention. The neutron log (black line), agrees very well with predictions based on $K/\rho$. The FDC log is in better agreement with the $V_p/V_s$ porosity estimate. As a further test of the porosity predictions of the present invention, the inventors compared the $K/\rho$ and $V_p/V_s$ predictions to porosity measurements made from actual cores over the same depth internal. The core porosity is shown in FIG. 11 with the core measurements (crosses) bounded by the $K/\rho$ and $V_p/V_s$ predictions, with the $K/\rho$ prediction being consistently larger and the $V_p/V_s$ consistently smaller. Along this depth interval, the two curves remain separated with the green to the left and the red to the right. The separation has been observed consistently in examination from data from other wells. Please note that the lines cross over each other at depths where gas production in this particular well is expected. This phenomenon will be described below.

Figure 12:
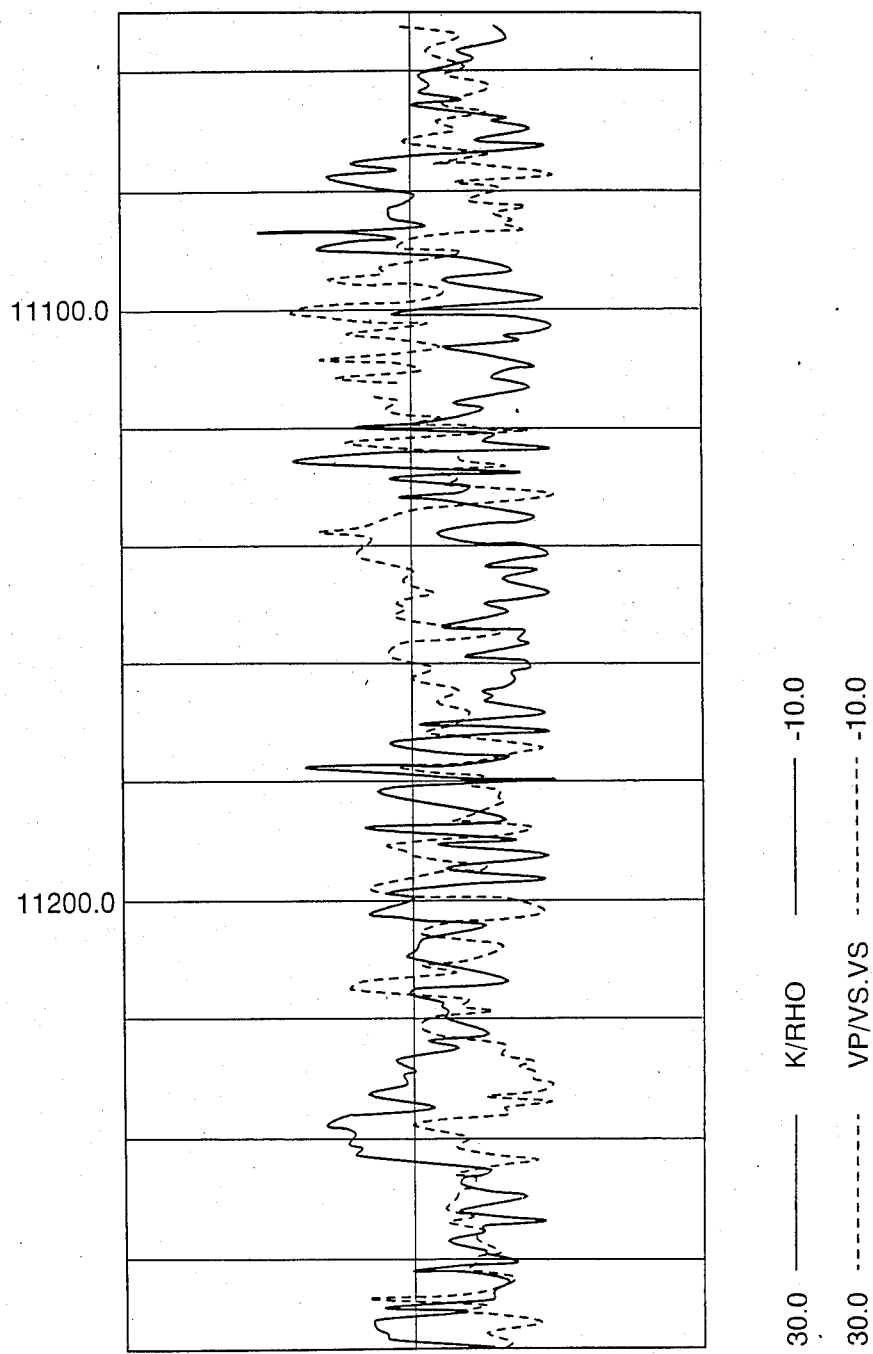
FIG. 12 is a plot comparison of porosity estimations of $V_p/V_s$ and $K/\rho$ in a wellbore traversing known zones of gaseous hydrocarbons.
Figure 13:
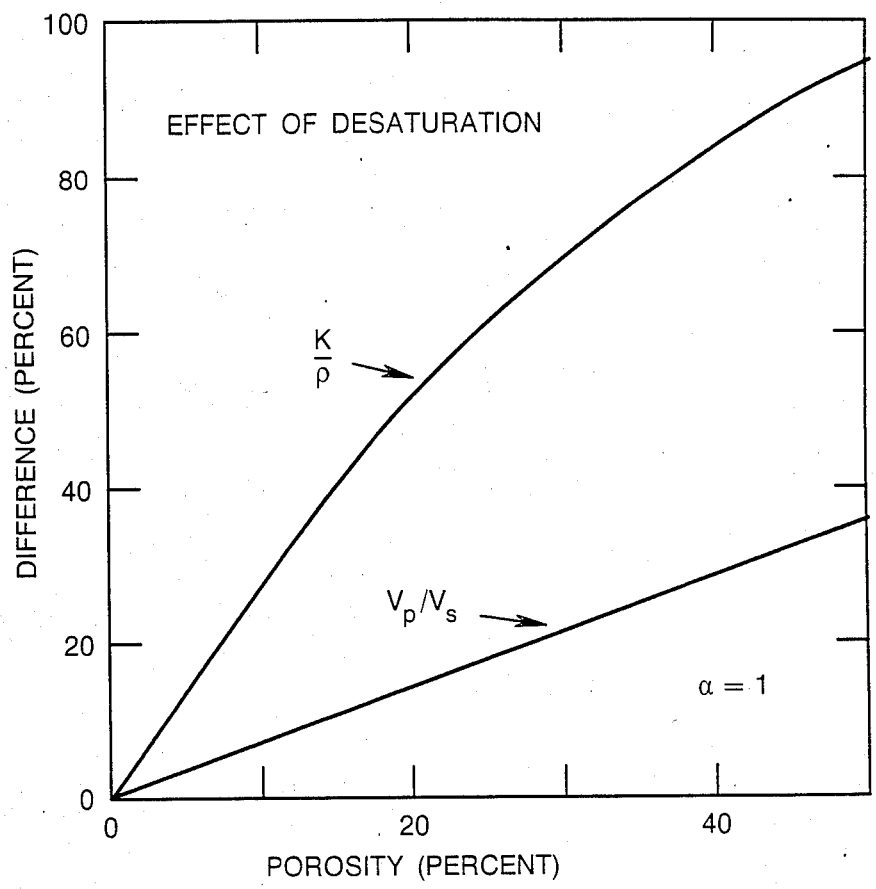
FIG. 13 is a plot of the relative sensitivity of $V_p/V_s$ and $K/\rho$ to changes in saturation.
Figure 14:
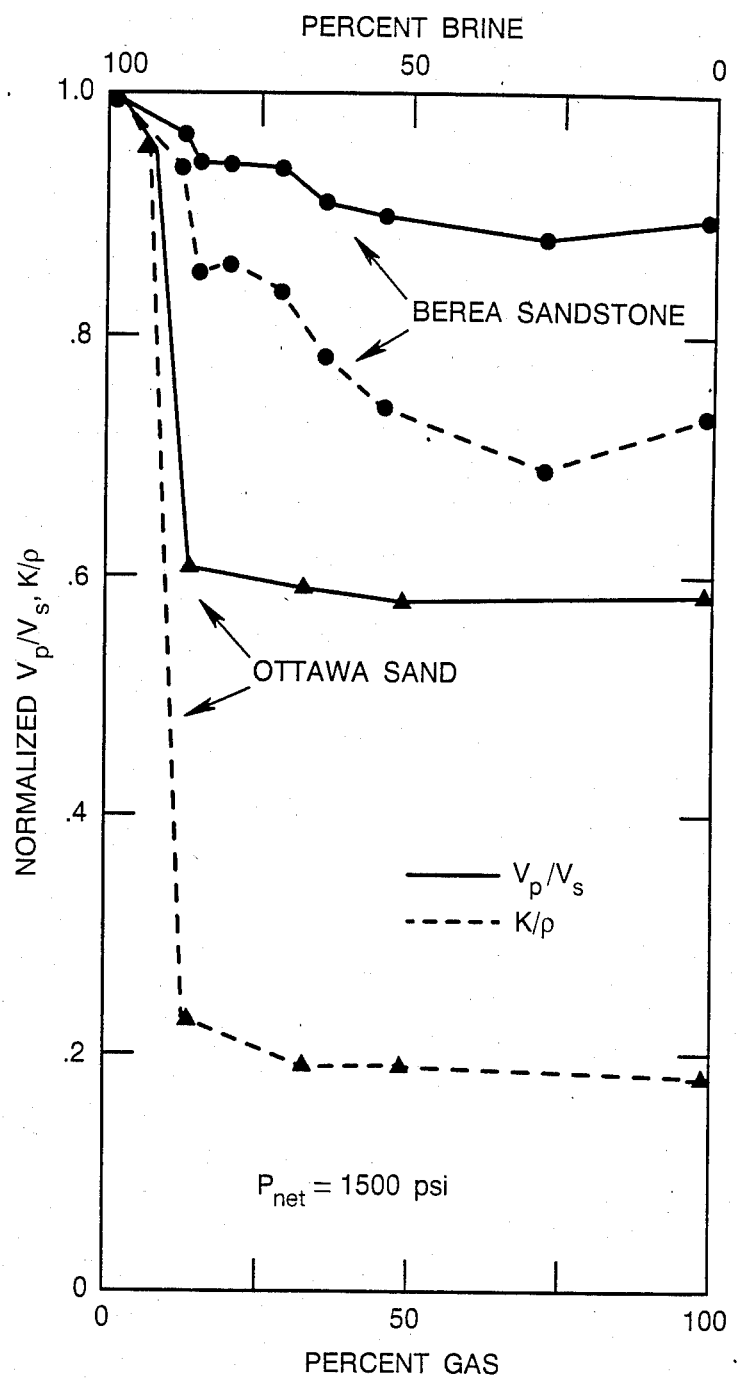
FIG. 14 is a plot of $V_p/V_s$ and $K/\rho$ as a function of gas saturation observed in consolidated Berea sandstone and an unconsolidated Ottawa sand.

The porosity predictions from a well are shown in FIG. 12 with the $K/\rho$ porosity predictions shown in green and $V_p/V_s$ predictions shown in red. Note that unlike the curves from FIG. 11, these porosity predictions overlap and cross each other over nearly the entire depth interval because gas was detected in this well over this interval. The inventors hereof believe that the method of the present invention provides an accurate indication of gaseous hydrocarbons because $V_p/V_s$ data and $K/\rho$ data display different sensitivities to partial saturations (FIGS. 4 and 5). The inventors calculated the percent change in each parameter for a saturation change of 100% and plotted these values as a function of crack porosity in FIG. 13. As anticipated, the change in $K/\rho$ is greater than that in $V_p/V_s$ at any porosity value chosen. These theoretical assessments are substantiated by laboratory measurements presented in FIG. 14 wherein the normalized values of $K/\rho$ and $V_p/V_s$ are plotted as a function of brine or gas saturation. The normalization factors were taken to be measured values for each parameter for a 100% brine saturation. Measurements are presented for a consolidated Berea sandstone and unconsolidated Ottawa sand. At any level of saturation, the measured change in $K/\rho$ exceeds that measured $V_p/V_s$ for any formation material type. The absolute differences are greater in the unconsolidated sand. The overlap of the prediction curves of FIG. 13 can therefore be interpreted for the reflection of the partial saturation condition. The $K/\rho$ curves cross over to lower porosity values under such conditions, thereby indicating the possible presence of a gaseous hydrocarbon.

The inventors hereof have found a method of determining the presence of a hydrocarbon gas at a particular location in an underground formation by determining a first series of porosity values using $V_p/V_s$, as described above, and determining a second series of porosity values using $K/\rho$ or $V_B$, as described above. Wherever the porosity value using $V_p/V_s$ is equal to or greater than a corresponding porosity value using $K/\rho$ or $V_B$, gaseous hydrocarbons can be present.

The means used for calculating and plotting the porosity values of the present invention can be the same as described earlier, including the use of a programmable digital computer to be used in the following manner:
  input boundaries of $V_p$ and $V_s$ for at least one formation material type;
  input boundaries of porosity for the chosen formation material type(s);
  calculate the porosity values in with the above described method; and compare such porosity values and output the depths where gaseous hydrocarbons are predicted.

Another method of the present invention is the determination of a shear velocity estimation from $V_p$ data and known values of $V_p$ and $V_s$ for different formation material types. An additional consequence of the $K/\rho$ plot in FIG. 6 is that the data can be fit to a single function, a line or curve, regardless of formation material types. This is important because this empirical function can then be used with $V_p$ information to predict $V_s$ data. This need for $V_s$ data arises in situations where only P-wave data exists and an estimate of shear-wave data is required before seismic lines are to be run.

In the method of the present invention, a plot is made of a function of $V_p$ on one axis and a function of $V_s$ on a second axis for at least two samples of at least one formation material type. A larger number of samples improves the definition of the formation material type and more formation material types improve the predictive capability of this method. Once the plot is made, then an equation in the form of $V_s = K_1 V_p + K_2 V_p^2 + K_3$, where $K_1$, $K_2$, and $K_3$ are fitted constants, is fitted to the plot of the data points. Once the equation has been determined, one can simply take an obtained $V_p$ value and solve the above equation for $V_s$ to obtain an estimate of $V_s$.

For example, a least squares fit to the data plot of FIG. 6 yields the following equation:

$$V_s = [(-2.467 \times 10^7) + (2.965 \times 10^3 V_p) + (0.236 V_p^2)]^{\frac{1}{2}}.$$

Figure 15:
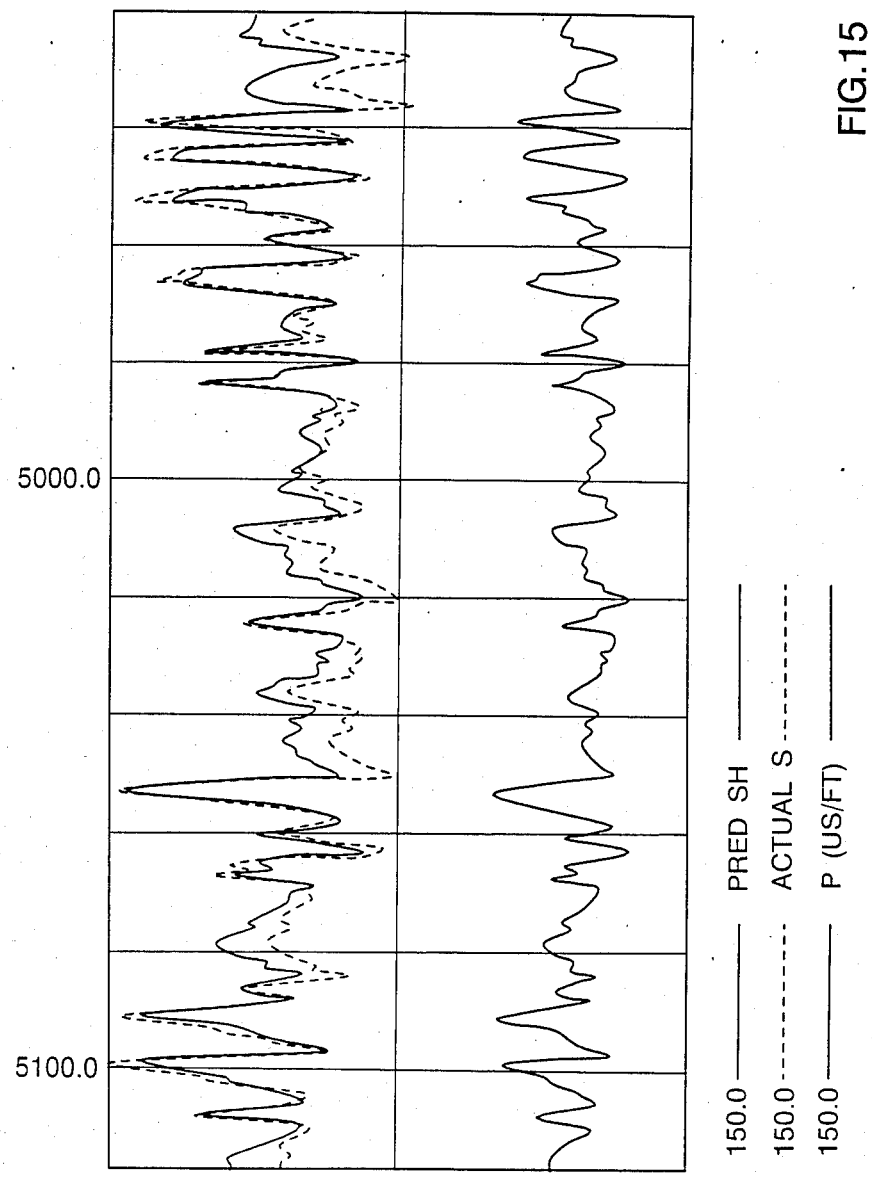
FIG. 15 is a plot comparison of $V_s$ from methods of the present invention (green) and full wavetrain measurement of $V_s$ (black). The red line is a measure of P-wave transit time.

This fit is based entirely on laboratory measurements from both carbonate and sandstone cores taken from the field where the $V_p$ and $V_s$ data of FIG. 6 was obtained. The measurements were taken from those made at confining pressures in excess of 3000 psi pressure under brine saturated conditions. Clearly, downhole conditions of undersaturation would cause deviations from certain predictions and the inventors have compared the above to sonic wavetrain derived $V_p$ velocity data to compare the predicted shear wave velocity with that measured by the same tool. These comparisons are shown in FIG. 15 and the information plotted is from two different wells. The red curve in FIG. 15 represents the measured P-wave transit time and the black and green curves are the measured and predicted shear wave transit time. When the same type of comparison is made between predicted and measured shear-wave velocities in other wells, the $V_s$ disagreement is usually less than ±5%, which is completely acceptable.

As previously shown and described above, the inventors hereof have found novel combinations of utilizing lithological information, compressional velocity data and shear velocity data to (a) determine formation material type in an underground formation, (b) determine the porosity of an underground formation, (c) determine the presence of a hydrocarbon gas at a particular location in an underground formation, and (d) determine shear velocity from obtained compressional velocity data and ratios of $V_p/V_s$ for at least one formation material type.

Wherein, the present invention has been described in particular relation to the above discussion and drawings attached hereto, it should be understood that other and further modifications, apart from those shown or suggested herein, may be made within the scope and spirit of the present invention.

What is claimed is:

1. A method of determining the formation material type at a particular location in an underground formation by utilizing compressional velocity data ($V_p$) and shear velocity data ($V_s$), comprising:
   (a) calculating bulk velocity ($V_B$) utilizing $V_p$ and $V_s$ data wherein $$V_B = (V_p^2 - (4/3)V_s^2)^{\frac{1}{2}} = \left[ \frac{\text{bulk modulus }(K)}{\text{density }(\rho)} \right]^{\frac{1}{2}};$$

(b) plotting $V_B$ on one axis and $V_p$ on a second axis to define a field of data points, wherein each data point corresponds to a particular location in the underground formation;
   (c) including velocity boundaries of $V_B$ and $V_p$ within the plot of (b) for at least one formation material type; and
   (d) determining from the position of a data point relative to the velocity boundaries, the formation material type.

2. The method of claim 1 wherein the velocity boundaries are determined in (c) for carbonates, sandstones, and shales.

3. A method of determining the porosity of an underground formation by utilizing compressional velocity ($V_p$) and shear velocity data ($V_s$), comprising:
   (a) calculating bulk velocity ($V_B$) utilizing $V_p$ and $V_s$ data wherein $$V_B = (V_p^2 - (4/3)V_s^2)^{\frac{1}{2}} = \left[ \frac{\text{bulk modulus }(K)}{\text{density }(\rho)} \right]^{\frac{1}{2}};$$

(b) plotting $V_B$ on one axis and ($V_p$, $V_s$ or $1/V_s$) on a second axis to define a field of data points, wherein each data point corresponds to a particular location within the underground formation;
   (c) including velocity boundaries of $V_B$ and ($V_p$, $V_s$ or $1/V_s$) within the plot of (b) for at least one formation material type;
   (d) determining from the position of the data points relative to the velocity boundaries the formation material types;
   (e) including on a third axis in the plot of (b), porosity boundaries for the formation material types to define a three-dimensional field of data points;
   (f) fitting to the three-dimensional field of data points of (e) a mathematical surface defined as $\phi = K_1 (V_p, V_s \text{ or } 1/V_s) + K_2 V_B + K_3$, where $K_1$, $K_2$ and $K_3$ are fitted constants; and
   (g) utilizing the $V_p$ and $V_s$ data, solving the equation of (f) to determine the porosity of the underground formation.

4. A method of determining the presence of a gaseous hydrocarbon at a particular location in an underground formation by utilizing compressional velocity data ($V_p$) and shear velocity data ($V_s$), comprising:
   (a) determining a first series of porosity values utilizing the equation Porosity $\phi = K_1 (V_p/V_s) + K_2 V_s + K_3$, where $K_1$, $K_2$ and $K_3$ are fitted constants;
   (b) determining a second series of porosity values utilizing the equation Porosity ($\phi$) = $K_4$ bulk velocity $V_B + K_5 V_p + K_6$ where $K_4$, $K_5$ and $K_6$ are fitted constants and $$V_B = (V_p^2 - (4/3)V_s^2)^{\frac{1}{2}} = \left[\frac{\text{bulk modulus }(K)}{\text{density }(\rho)}\right]^{\frac{1}{2}};$$

(c) determining at which location in an underground formation a value of porosity from (a) is equal to or less than a corresponding value of porosity from (b) thereby indicating the presence of a gaseous hydrocarbon.

5. The method of claim 4 wherein step (c) includes utilizing parallel line plots of the first and second series of porosity values.

6. The method of claim 4 wherein step (a) comprises:
  (a) plotting $V_p/V_s$ on one axis and ($V_p$, $V_s$, or $1/V_s$) on a second axis to define a field of data points, wherein each data point corresponds to a particular location within the underground formation;
  (b) including velocity boundaries of $V_p/V_s$ and ($V_p$, $V_s$ or $1/V_s$) within the plot of (a) for at least one formation material type;
  (c) determining from the position of the data points relative to the velocity boundaries the formation material types;
  (d) including on a third axis in the plot of (a), porosity boundaries for the formation material types to define a three-dimensional field of data points;
  (e) fitting to the three-dimensional field of data points of (d) a mathematical surface defined as Porosity $(\phi)=K_1 \ (V_p, \ V_s, \ \text{or} \ 1/V_s) + K_2 \ (V_p/V_s) + K_3$, where $K_1$, $K_2$, and $K_3$ are fitted constants; and
  (f) utilizing the $V_p$ and $V_s$ data, solving the equation in (e) to determine the porosity.

7. The method of claim 4 wherein (e) comprises:
  (a) plotting S on one axis and ($V_p$, $V_s$ or $1/V_s$) on a second axis to define a field of data points, wherein each data point corresponds to a particular location within the underground formation;
  (b) including velocity boundaries of $V_B$ and ($V_p$, $V_s$, or $1/V_s$) within the plot of (a) for at least one formation material type;
  (c) determining from the position of the data points relative to the velocity boundaries the formation material types;
  (d) including on a third axis in the plot of (a), porosity boundaries for the formation material types to define a three-dimensional field of data points;
  (e) fitting to the three-dimensional field of data points of (d) a mathematical surface defined as Porosity $(\phi)=K_1 \ (V_p, \ V_s, \ \text{or} \ 1/V_s) + K_2 \ V_B + K_3$, where $K_1$, $K_2$, and $K_3$ are fitted constants; and
  (f) utilizing the $V_p$ and $V_s$ data, solving the equation in (e) to determine the porosity.

8. A method of determining shear velosity ($V_s$) comprising:
  (a) determining the ratios of $V_p$ and $V_s$ for at least one formation material;
  (b) plotting $V_s$ on one axis and $V_p$ on a second axis for at least two samples of at least one formation material type to define a field of data points;
  (c) fitting an equation: $V_s = K_1 \ (V_p) + K_2 \ V_p^2 + K_3$ to the field of data points, where $K_1$, $K_2$ and $K_3$ are fittend constants; and
  (d) utilizing the $V_p$ data, solving the equation in (c) for $V_s$.

* * * * *